US008077700B2

(12) United States Patent
Maes (10) Patent No.: US 8,077,700 B2
(45) Date of Patent: Dec. 13, 2011

(54) DYNAMIC CALL CHARACTERISTIC CONTROL ON A PER CALL BASIS

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 748 days.

(21) Appl. No.: 11/264,787

(22) Filed: Oct. 31, 2005

(65) Prior Publication Data

US 2007/0097876 A1 May 3, 2007

(51) Int. Cl.
*H04L 12/66* (2006.01)
(52) U.S. Cl. .................... 370/352; 370/401
(58) Field of Classification Search .............. None
See application file for complete search history.

(56) References Cited

U.S. PATENT DOCUMENTS

| | | | | |
|---|---|---|---|---|
| 6,453,042 B1* | 9/2002 | Roach et al. | | 379/395 |
| 6,584,190 B1* | 6/2003 | Bressler | | 379/230 |
| 6,785,339 B1* | 8/2004 | Tahernezhaadi et al. | | 375/241 |
| 7,043,749 B1* | 5/2006 | Davies | | 725/120 |
| 7,075,921 B2* | 7/2006 | Siegrist et al. | | 370/352 |
| 7,535,892 B2* | 5/2009 | Chun | | 370/352 |
| 7,599,357 B1* | 10/2009 | Croak et al. | | 370/352 |
| 2002/0101830 A1* | 8/2002 | LeBlanc | | 370/286 |
| 2002/0101854 A1* | 8/2002 | Siegrist et al. | | 370/352 |
| 2003/0112947 A1* | 6/2003 | Cohen | | 379/202.01 |
| 2005/0141493 A1* | 6/2005 | Hardy et al. | | 370/356 |
| 2005/0152524 A1* | 7/2005 | Carlson et al. | | |
| 2005/0254483 A1* | 11/2005 | Factor et al. | | 370/352 |
| 2005/0259636 A1* | 11/2005 | Chun | | 370/352 |

FOREIGN PATENT DOCUMENTS

| | | | |
|---|---|---|---|
| GB | 2399960 A * | 9/2004 | |
| JP | 05-236538 | 9/1993 | |
| JP | 2003-008665 A | 1/2003 | |
| JP | 2003-509974 A | 3/2003 | |
| WO | WO 2004/006462 A1 * | 1/2004 | |

OTHER PUBLICATIONS

Sijben, P. et al.; "Toward the PSTN/Internet Inter-Networking MEDIA DEVICE CONTROL PROTOCOL"; 1998, *IETF Standard-Working-Draft, Internet Engineering Task Force*, chapter 5.64, pp. 1-39.*

* cited by examiner

*Primary Examiner* — Robert Scheibel
(74) *Attorney, Agent, or Firm* — Kilpatrick Townsend & Stockton LLP (57) ABSTRACT

Techniques for dynamically adjusting volume during a call are provided. A gateway is provided that allows a call between a first device and a second device. The call may be routed through a first network and a second network. The first network may be PSTN network and the second network may be a VOIP network. An indication may be received at the gateway that indicates a call characteristic should be adjusted for the call. For example, the indication may indicate the volume or echo should be adjusted. The gateway may then adjust the volume or eliminate echo during the call based on the indication. The adjustment is affected during the call at the first device and the second device. For example, the gateway may dynamically adjust the gain for the call resulting in a change in the call characteristic.

19 Claims, 6 Drawing Sheets

DYNAMIC CALL CHARACTERISTIC CONTROL ON A PER CALL BASIS

BACKGROUND OF THE INVENTION

The present invention generally relates to telecommunications and more specifically to dynamic adjustment of call characteristics at a gateway on per call basis.

Voice over internet protocol (VOIP) solutions are being used by many users who make telephone calls. VOIP provides an inexpensive and flexible telephony system that may be used in lieu of or in conjunction with a public switch telephone network (PSTN).

Although VOIP is used, calls may still be connected between PSTN telephones and VOIP telephones. Thus, the calls go through a PSTN network and VOIP network. When these calls occur, call quality may be poor because of the differences in the networks. For example, the PSTN side and/or VOIP side may suffer from poor volume level and/or echo.

Gateways may be calibrated in an attempt to minimize poor call quality. For example, the gain may be calibrated for calls made through the gateway. This calibration is a global adjustment for all calls made through the gateway or calls from an end point.

Some telephones may have a volume adjustment local to the handset that may used to adjust the volume on the phone. This solution, however, does not remedy the poor call quality for the call (e.g., as perceived by other participants).

BRIEF SUMMARY OF THE INVENTION

Embodiments of the present invention generally relate to dynamically adjusting characteristics during a communication.

In one embodiment, techniques for dynamically adjusting volume or eliminating echo during a call are provided. A gateway is provided that allows a call between a first device and a second device. The call may be routed through a first network and a second network. The first network may be PSTN network and the second network may be a VOIP network. An indication may be received at the gateway that indicates a call characteristic should be adjusted for the call. For example, the indication may indicate the volume or echo should be adjusted. The gateway may then adjust the volume during the call or eliminating echo based on the indication. The adjustment is effected during the call at the first device and the second device. For example, the gateway may dynamically adjust the gain or impedance for the call resulting in a change in the call characteristic.

In one embodiment, a method for dynamically adjusting a characteristic for a communication using a gateway is provided. The method comprises: allowing a communication between a first device and a second device at the gateway, the communication being routed through a first network and second network, the first network being different from the second network; receiving an indication at an adjuster of the gateway that a characteristic should be adjusted for the communication; and adjusting the characteristic at the gateway during the communication based on the indication, the adjustment being effected at the first device and the second device during the communication.

In another embodiment, a method for dynamically adjusting gain or impedance during a call using a gateway is provided. The method comprises: allowing the call between a first device and a second device at a gateway, the call being routed through a PSTN network and VOIP network, the first device including a PSTN device and the second device including a VOIP device; receiving an indication at an adjuster of the gateway that a call characteristic should be adjusted for the call; and adjusting gain or impedance for the call at the gateway based on the indication, the adjustment being effected at the first device and the second device during the call.

In yet another embodiment, a system for dynamically adjusting a characteristic for a communication is provided. The method comprises: a first device configured to communicate using a first network; a second device configured to communicate using a second network; and a gateway configured to allow a communication between the first device and the second device, the communication being routed through a first network and the second network, the first network being different from the second network, the gateway comprising: an adjuster configured to: receive an indication at an adjuster of the gateway that a characteristic of the communication should be adjusted for the call; and adjust the characteristic during the communication based on the indication, the adjustment being effected at the first device and the second device during the communication.

In another embodiment, an information storage medium having a plurality of instructions for dynamically adjusting a characteristic for a communication using a gateway is provided. The steps include: allowing a communication between a first device and a second device at the gateway, the communication being routed through a first network and second network, the first network being different from the second network; receiving an indication at an adjuster of the gateway that a characteristic should be adjusted for the communication; and adjusting the characteristic at the gateway during the communication based on the indication, the adjustment being effected at the first device and the second device during the communication.

A further understanding of the nature and the advantages of the inventions disclosed herein may be realized by reference of the remaining portions of the specification and the attached drawings.

DETAILED DESCRIPTION OF THE INVENTION

Figure 1:
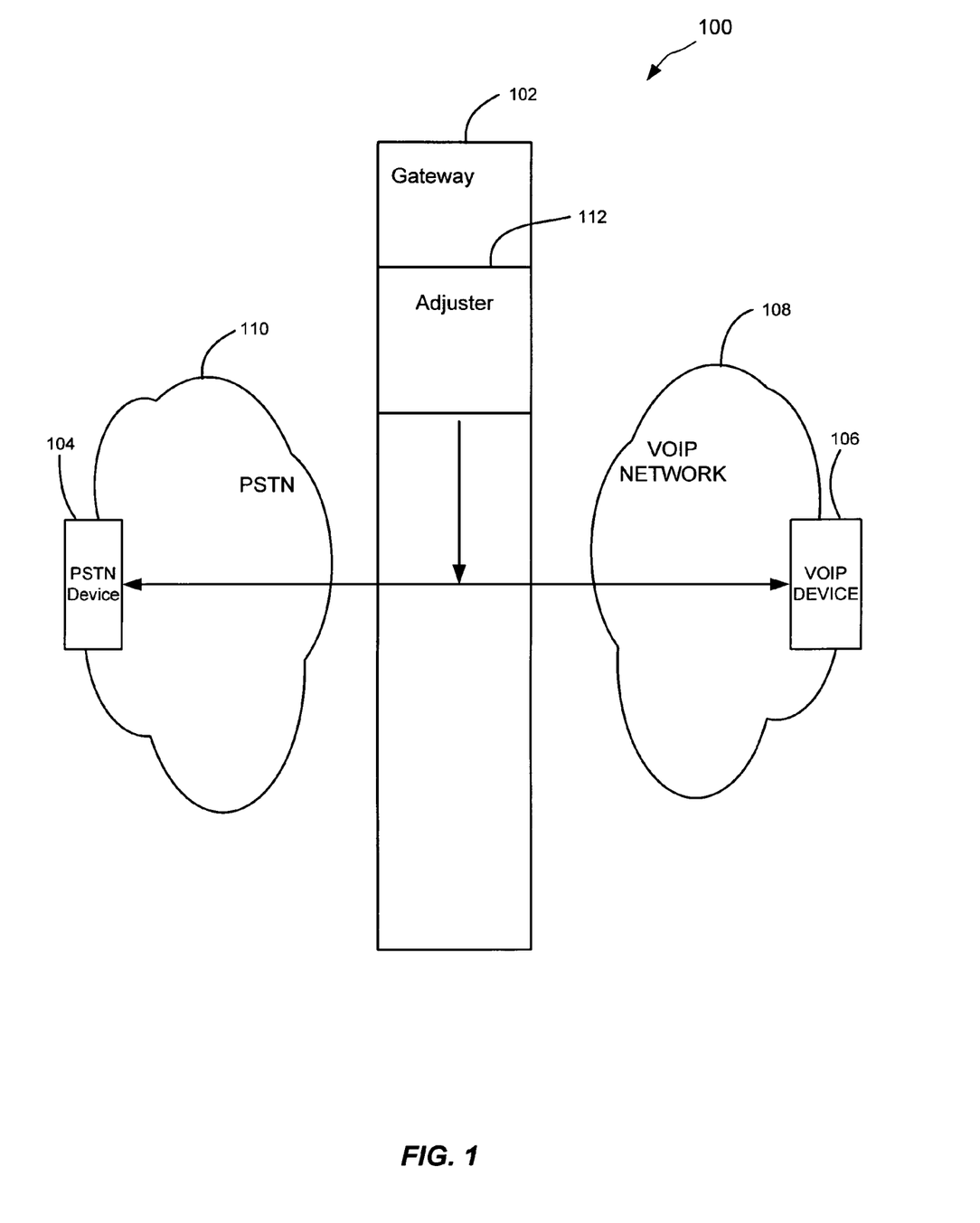
FIG. 1 depicts a system for providing dynamic adjustment of call characteristics according to one embodiment of the present invention.

FIG. 1 depicts a system 100 for providing dynamic adjustment of call characteristics according to one embodiment of the present invention. As shown, system 100 includes a gateway 102, PSTN device 104, VOIP device 106, a VOIP network 108, and a PSTN 110.

Gateway 102 is configured to connect devices in a communication. The communication may be any exchange of data between devices. For example, the communication may be any network to network transition, any media exchange, a telephone call, a download of data, web conference, or any communication session, etc. For discussion purposes, a communication will be referred to as a call between devices.

Network 110 may be a public switched network (referred to as "PSTN 110 hereinafter) that includes a collection of interconnected voice-oriented public telephone networks. PSTN 110 may also be referred to as a plain old telephone service (POTS) network. Circuit-switching telephone networks may be connected to provide PSTN 110.

Network 108 may be a VOIP network (referred to as VOIP network 108 hereinafter) that includes any packet based switching network(s). VOIP network 108 delivers voice communications using internet protocol (IP) technology. Generally, voice information is in a digital form and sent using packets. This is in contrast to data that is sent using a traditional circuit switched-protocol used in PSTN 110. VOIP network 108 may use various protocols, such as H.323, session initiation protocol (SIP), etc.

Although calls are described as being routed through VOIP network 108 and PSTN 110, call characteristics may be dynamically adjusted for a call routed through any networks. In one embodiment, call characteristics may be adjusted for any network transition between disparate networks. For example, network transitions may be SIP to VOIP, H323 or VOIP, or SIP to PoC (push to Talk), internet to IMS (IP Multimedia subsystem), or any exchange of other media than voice (e.g. video, music, web conference, etc.). Also, network 108 and network 110 may be the same network (e.g., same protocol) but there may be a transition from one network to another network.

PSTN device 104 includes any device that communicates using PSTN 110. For example, PSTN device 104 may be an end user's telephone used to make a telephone call. Also, PSTN device 104 may be any other device used to route the call, such as any switches, or any other devices in a PSTN network.

VOIP device 106 includes any device capable communicating with VOIP network 108. For example, VOIP device 106 may be an end user device used to initiate a call, such as a computer, cellular phone, instant messenger client, VOIP telephone, softphone, voice chat client, etc. Also, VOIP device 106 may be a server, an agent for an end user device, such as a VOIP agent that communicates with gateway 102 while routing the call, etc. In one embodiment, VOIP device 106 may be a SIP agent for an end user device (e.g., telephone).

Although the call is shown as being connected between a PSTN device 104 and a VOIP device 106, it will be understood that gateway 102 may be used to connect calls between any devices. For example, PSTN device 104 and VOIP device 106 may be any devices that are compatible with the networks routing the call.

Adjustor 112 is configured to dynamically adjust a call characteristic during a call between PSTN device 104 and VOIP device 106. A call may be any communication between PSTN device 104 and VOIP device 106. For example, the call may be a voice call, a data call, a streaming media communication, any download of information, etc.

In one embodiment, an indication is received at adjustor 112. The indication may be received from PSTN device 104, VOIP device 106, a module in gateway 102, a remote agent different from PSTN device 104 and VOIP device 106, or any other device. Different scenarios of receiving the indication will be described below.

Adjustor 112 uses the indication to adjust a characteristic during the call. The characteristic may be any characteristic of a call, such as gain, impedance, volume, echo, etc. This adjustment is made for the call and affects the PSTN device 104 and VOIP device 106 during the call. Thus, adjustments may be dynamically made on a call by call basis.

In one embodiment, characteristics, such as gain, for gateway 102 are calibrated for all calls being connected through gateway 102 or for an endpoint (e.g., a telephone, or any end device). This is a global adjustment that is supposed to maximize call quality. However, due to certain factors, the globally adjusted gain may not be satisfactory for all calls. For example, factors that contribute to characteristics that affect calls may vary for each call. The type of connection (e.g., speed of the connection), impedance mismatches, the type of PSTN device or VOIP device, the distance, etc. may affect the call characteristics of a call. For example, when transitions between networks occur, the calls may be affected. Thus, call characteristics may be poor for specific calls. Accordingly, embodiments of the present invention provide dynamic adjustments while a call is being made. This is more advantageous than globally adjusting characteristics for all calls (i.e., calibrating the gateway). Also, it is typically not possible for devices 104 and 106 to make the adjustments themselves without gateway 102.

Also, if a global change is made, a call that is experiencing poor call characteristics may not be affected by the global change. Thus, users on existing calls would have to disconnect their call and initiate a new call. Further, the global changes may not be acceptable for all calls being made.

As described above, factors that are introduced on a call by call basis may be result in poor call characteristics. For example, a call may result in poor volume or echo on one or both sides of gateway 102. Latencies that are introduced into the call by PSTN 110 or VOIP network 108 may affect call characteristics. The latency may be delays that are introduced by a network. For example, the latencies may be because of packet latencies or bandwidth dips in the VOIP network side. These latencies may result in poor volume.

Also, impedance mismatches between PSTN 110 and VOIP network 108 may result in poor call characteristics. For example, impedance mismatches may result in echo (i.e., the echoing of words).

In one embodiment, gain may be adjusted at gateway 102 to adjust the call characteristics while the call is taking place. Gain may be the amplification factor, which is the extent to which an analog amplifier boosts the strength of a signal. By increasing the gain of a signal of the call, the volume may be adjusted. Also, by adjusting the gateway impedance, impedance mismatches on different sides of gateway 102 (e.g., the VOIP side and PSTN side) can be eliminated thereby removing echo in a call.

In order to address the above problems, embodiments of the present invention allow adjustor 112 to adjust the call characteristics on a call by call basis. Thus, during a call, the call characteristics may be adjusted for that call dynamically.

The following figures depict various embodiments of systems for dynamically adjusting call characteristics. Although these embodiments are discussed, it will be recognized that other systems and methods may be used.

Figure 2:
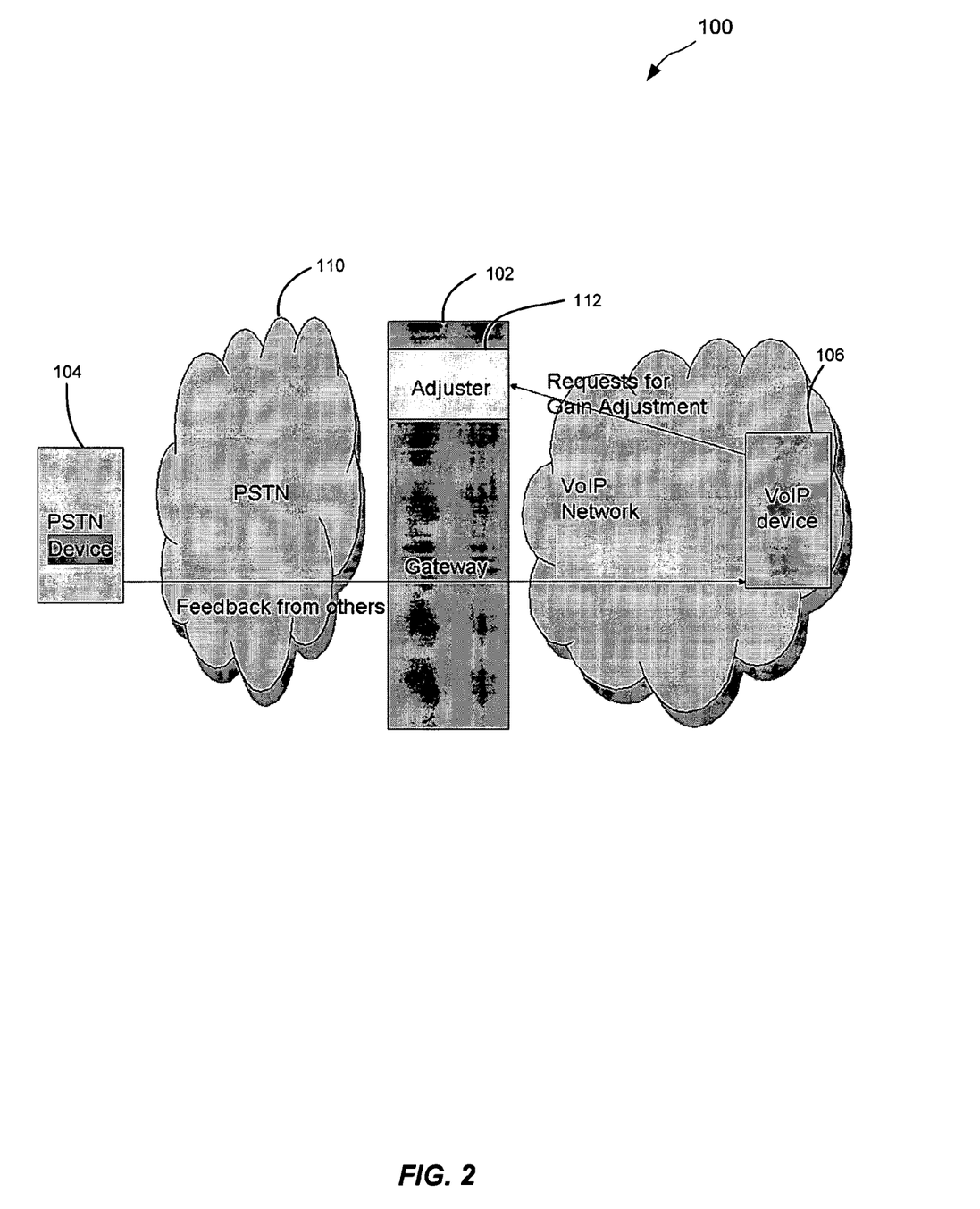
FIG. 2 depicts a first embodiment of the system according to embodiments of the present invention.

FIG. 2 shows a first embodiment of system 100 according to embodiments of the present invention. A call is connected between PSTN device 104 and VOIP device 106. While on the call, PSTN device 104 and/or VOIP device 106 may determine that call characteristics are poor. For example, the volume may be too low or too high, or an echo may be occurring.

VOIP device 106 is provided with a controller that can send an indication to adjustor 112 to change certain call characteristics. For example, the indication may be sent to increase or decrease the volume on the call. Also, the indication may indicate that an echo is occurring.

The indication may be sent by VOIP device 106 using a web service call, a proprietary call, or any other methods of communicating with adjustor 112. For example, proprietary or web service calls may configured such that VOIP device 106 knows where to send the indication and network 108 knows how to send it to adjustor 112. Also, the message sent may be a session initiation protocol message, such as a SIMPLE message, a MSRP message or via SIP NOTIFY events. The SIP message may be sent to an address for gateway 102. Other methods of communicating the indication to gateway 102 may also be appreciated.

In one embodiment, VOIP device 106 may include a user interface that is used to send an indication to adjustor 112. The user interface may include a feature that allows the user to change a call characteristic, such as increasing/decreasing volume, decreasing echo, etc.

In one embodiment, if a user decides that call characteristics are poor, then an indication can be sent. For example, if a user of PSTN device 104 would like call characteristics to be changed, the user may tell the user of VOIP device 106 that the call characteristics need to be changed. The user of PSTN device 104 may request that volume increased or decreased or say that an echo is being heard. Also, the exchange between users may take place via exchanges of data in other channels. For example, a user may send an instant message to the other user saying the volume is too low. The notification may also be automated as discussed after via systems that detect the problems on the other side and communicate it to gateway 102 or the other device or user. A user of VOIP device 106 may use the interface to cause VOIP device 106 to send an indication for a change in call characteristics.

Adjustor 112 is configured to adjust the call characteristics when the indication is received. The indication may indicate how much a call characteristic should be changed. For example, the indication may indicate that the volume should be increased or decreased a certain amount, etc. Also, the indication may indicate that a certain amount of echo is being heard.

Adjustor 112 is then configured to adjust the call characteristics during the call. Then, once the call characteristics are changed, the changes are effected on the call for PSTN device 104 and VOIP device 106. In one embodiment, gain may be adjusted for the call. By adjusting the gain, the volume may be increased or decreased. The above process may be performed iteratively until the call characteristics are satisfactory.

If echo is being eliminated, then feedback may be provided by PSTN device 102 as echo is adjusted. VOIP device 106 may send indications to adjustor 112 to adjust the gain and/or impedance of gateway 102 to eliminate echo. Feedback may continue to determine if the echo being detected is getting worse or better. In one embodiment, the impedance between PSTN device 104 and VOIP device 106 may be changed to remove the differences between impedances of both devices. By changing the impedances to remove the differences, the echo may be removed. Changing impedance is one way of changing the gain for a particular call. It will be recognized that other methods of removing or canceling echo may be provided (e.g. introducing artificial delays, etc.).

Figure 3:
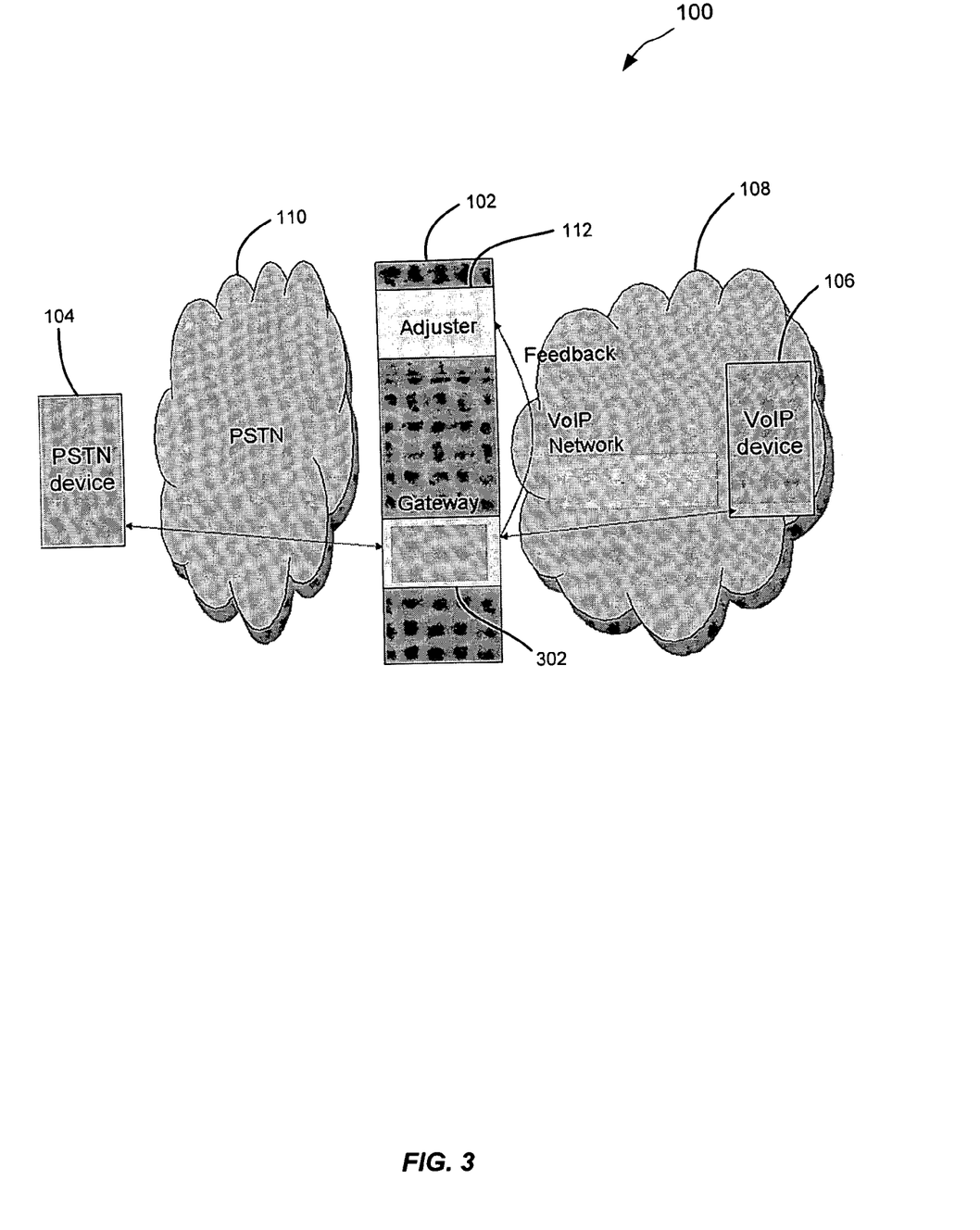
FIG. 3 depicts a second embodiment of the system according to embodiments of the present invention.

FIG. 3 shows a second embodiment of system 100 according to embodiments of the present invention. As shown, a module 302 in gateway 102 is configured to detect call characteristics of a call between PSTN device 104 and VOIP device 106. For example, module 302 may be able to check the volume on the call. In one embodiment, module 302 automatically measures a gain that is being generated on the call. For example, the gain generated by a digital or analog PSTN signal may be measured. In another embodiment, module 302 may listen to the call to determine if volume needs to be adjusted. Also, module 302 may listen for an echo.

If call characteristics need to be changed, module 302 sends an indication to adjustor 112. For example, module 302 may send an indication that indicates that the gain is too low or too high (any channel may be used to send the indication). Adjustor 112 then adjusts the gain for the call thereby adjusting the volume or canceling the echo.

Figure 4:
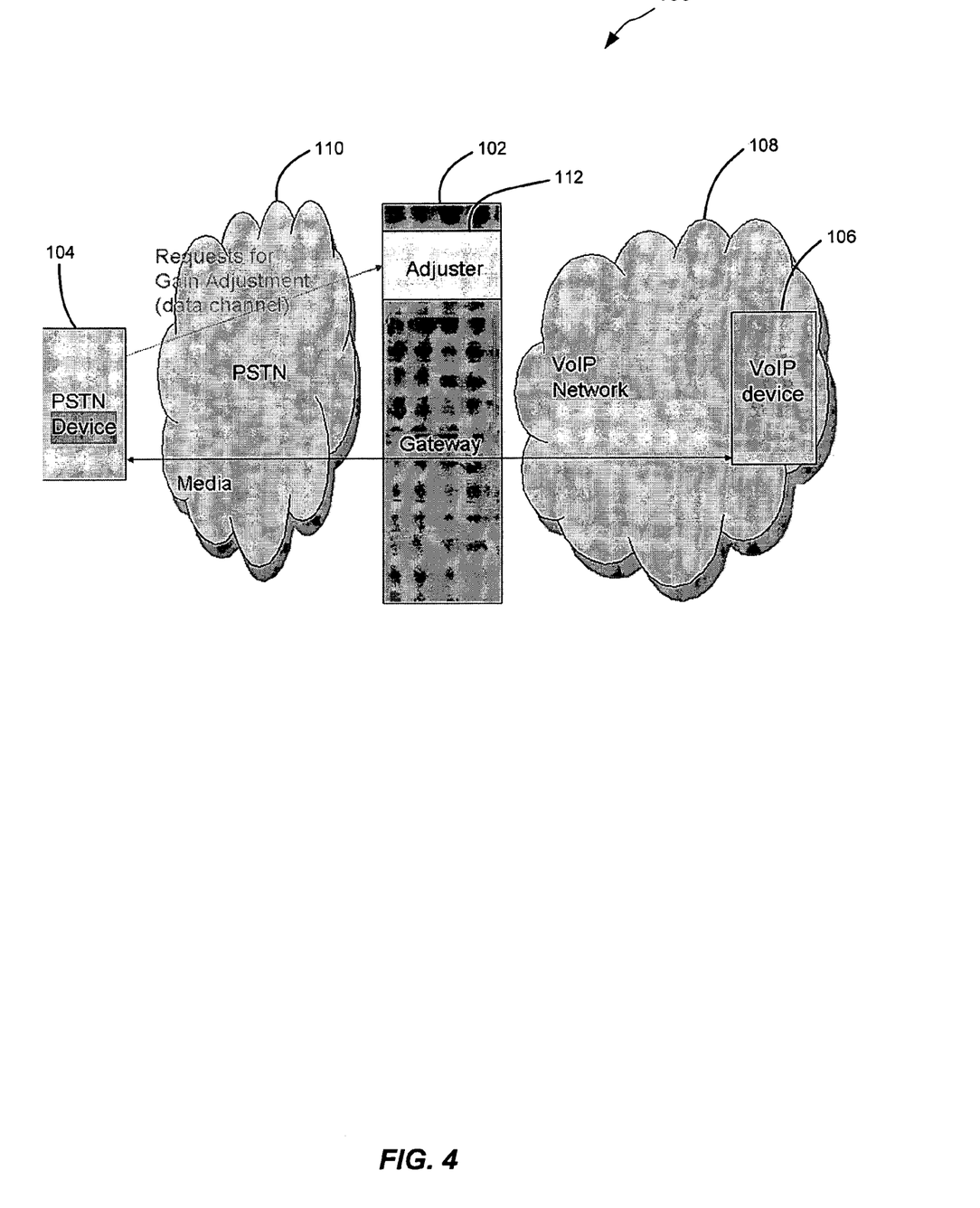
FIG. 4 depicts a third embodiment of the system according to embodiments of the present invention.

FIG. 4 depicts a third embodiment of system 100 according to embodiments of the present invention. As shown, PSTN device 104 may be used to adjust call characteristics. For example, PSTN device 104 may use a separate channel to communicate the indication to change a call characteristic to adjustor 112.

PSTN device 104 may be aware of gateway 102 and use session information to request a change in call characteristics. For example, PSTN device 104 may also include a data channel, such as an Internet connection. A PSTN telephone can be on the call and then open up a data channel to adjustor 112. This may be achieved by posting via a web service or by a web page. For example, the call may be identified using the VOIP phone number for VOIP device 106, IP address for VOIP device 106, or any other identifying information. In one example, all incoming calls for the telephone number used by the PSTN device 104 may be listed on the web page. The user may select the call corresponding to the incoming call and choose to send an indication to gateway 102. The indication is then sent to adjuster 112.

The web page may include an ability to adjust the volume or cancel the echo for all calls that are currently active for PSTN device 104. The indication is then sent to adjustor 112. Adjustor 112 can then change the call characteristics for the call.

Figure 5:
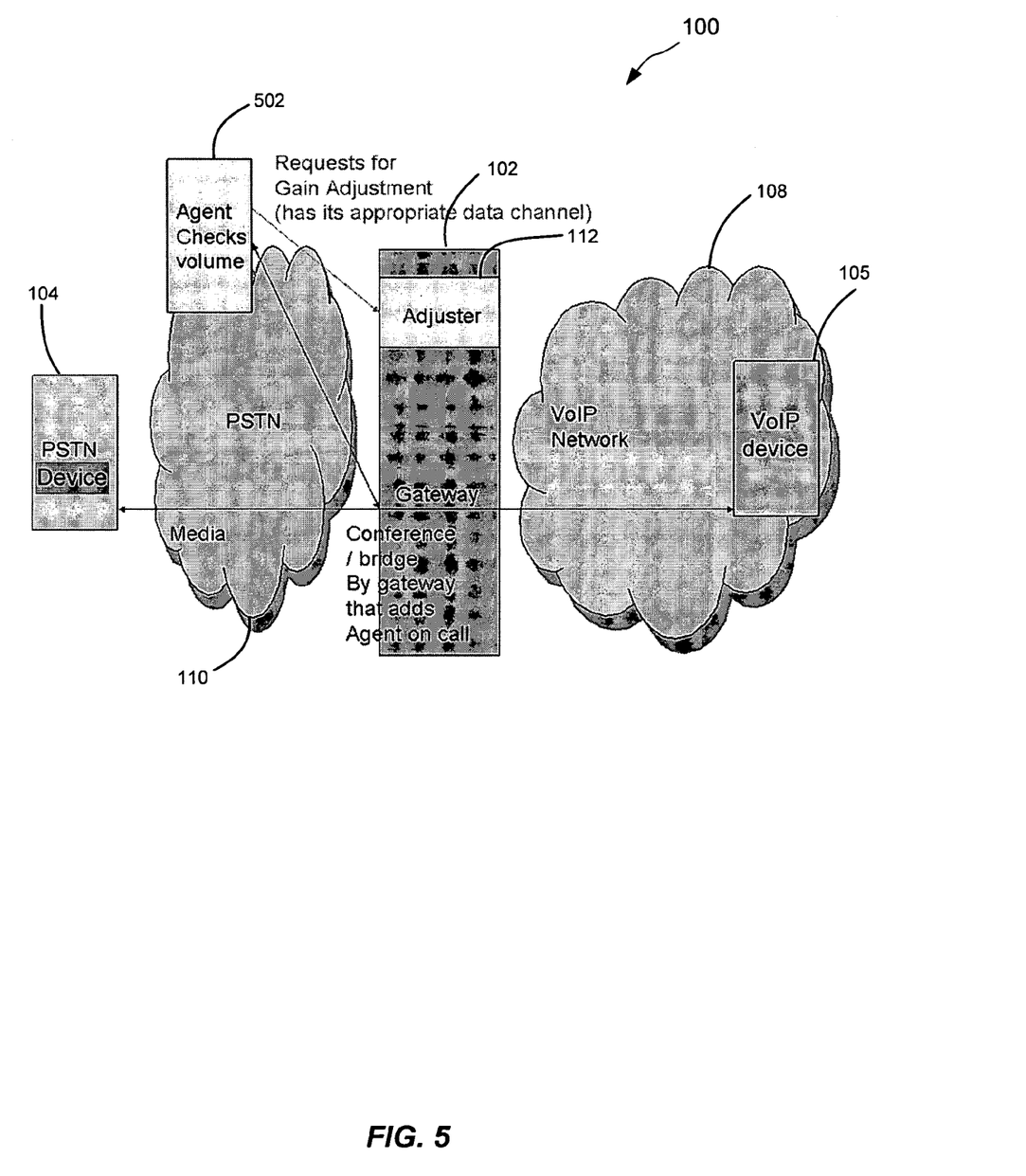
FIG. 5 depicts a fourth embodiment of the system according to embodiments of the present invention.

FIG. 5 depicts a fourth embodiment of system 100 according to embodiments of the present invention. An agent 502 is able to check call characteristics on a call between PSTN device 104 and VOIP device 106. Agent 502 then sends an indication to adjustor 112 that is used to change the call characteristics.

Agent 502 may be a probe that is added to PSTN 110. The probe may be an additional telephone that is conferenced into the call (e.g., by using a conference bridge). For example, when a call is made using PSTN device 104, agent 502 is conferenced into the call. The probe checks the call characteristics to determine if they are sufficient. For example, the volume or echo may be checked by checking the gain on the call.

Agent 502 then sends an indication to adjustor 112. The indication may be sent to gateway 102. For example, agent 502 is configured to communicate with adjustor 112 through a data channel. Adjustor 112 may then adjust the call characteristics, such as by adjusting the gain.

Once agent 502 has checked the call characteristics and sent an indication to adjustor 112, agent 502 may drop out of the call. Also, if agent 502 determines that the call characteristics do not need any changes, agent 502 may just drop of out of the call without performing any actions.

Accordingly, embodiments provide dynamic adjustment of call characteristics on a per call basis. The call characteristics that can be changed are characteristics that cannot be changed using solely VOIP device 106 and/or PSTN device 102. For example, the gain is changed by gateway 102 in order to adjust volume or cancel echo for a call. The gain on a call cannot be changed by VOIP device 106 and/or PSTN 102 without using gateway 102. Thus, gateway 102 is used to dynamically adjust the call characteristics during a call. This provides specific tuning for a call rather than a global adjustment across all calls.

Accordingly, quality and customer satisfaction is provided. Users can adjust the call themselves when poor call quality is noticed. Because of the differences in various networks connecting calls, it may be likely that poor call quality may occur. Thus, if poor volume or significant echo occurs on one side of gateway 102, it can be adjusted using the techniques provided above during the call. Thus, users do not have to hang up and attempt a call again. The adjustment may also be provided automatically or based on user feedback.

Figure 6:
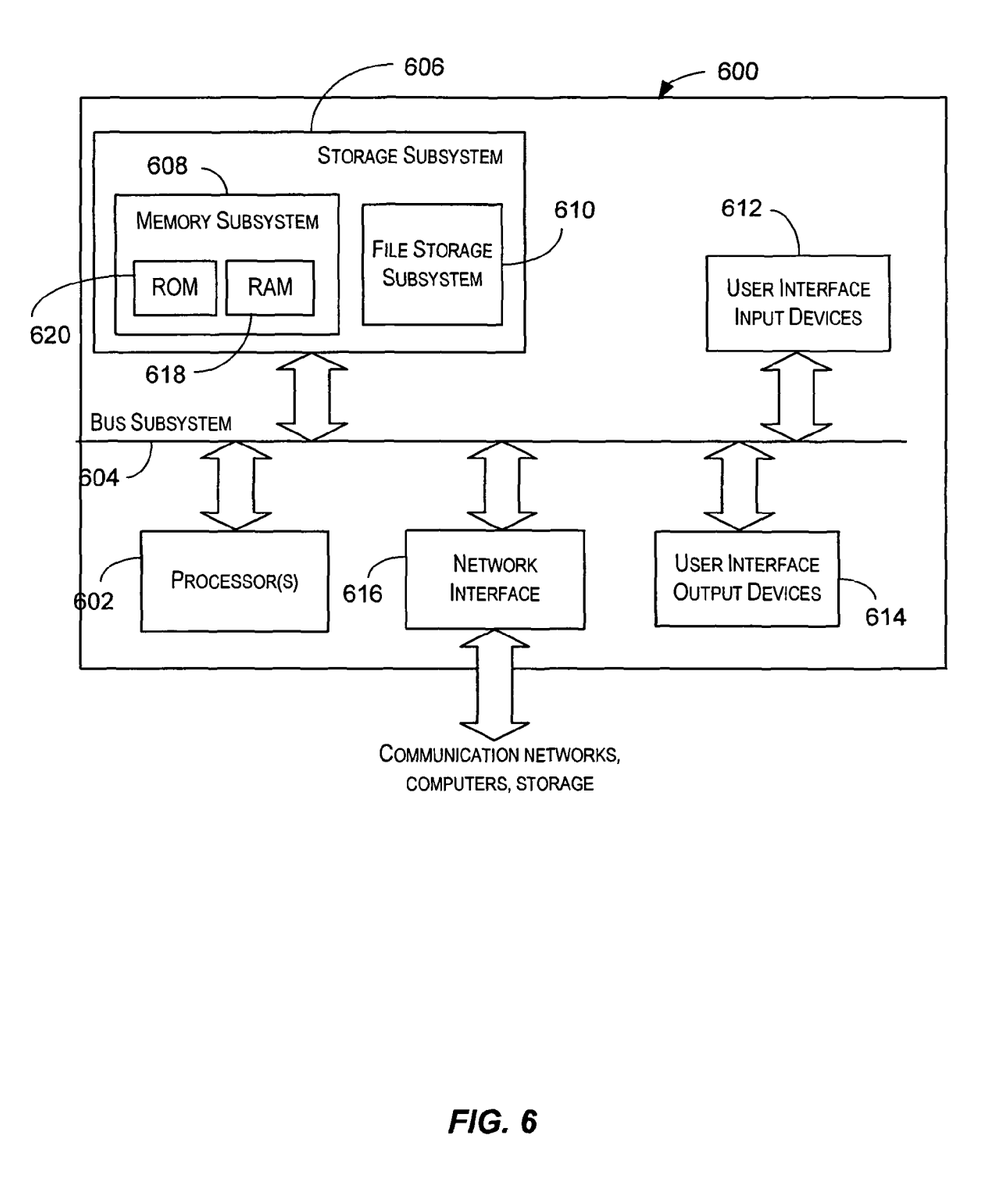
FIG. 6 is a simplified block diagram of a data processing system that may be used to perform processing according to an embodiment of the present invention.

FIG. 6 is a simplified block diagram of data processing system 600 that may be used to perform processing according to an embodiment of the present invention. As shown in FIG. 6, data processing system 600.includes at least one processor 602, which communicates with a number of peripheral devices via a bus subsystem 604. These peripheral devices may include a storage subsystem 606, comprising a memory subsystem 608 and a file storage subsystem 610, user interface input devices 612, user interface output devices 614, and a network interface subsystem 616. The input and output devices allow user interaction with data processing system 602.

Network interface subsystem 616 provides an interface to other computer systems, networks, and storage resources. The networks may include the Internet, a local area network (LAN), a wide area network (WAN), a wireless network, an intranet, a private network, a public network, a switched network, or any other suitable communication network. Network interface subsystem 616 serves as an interface for receiving data from other sources and for transmitting data to other sources from data processing system 600. Embodiments of network interface subsystem 616 include an Ethernet card, a modem (telephone, satellite, cable, ISDN, etc.), (asynchronous) digital subscriber line (DSL) units, and the like.

User interface input devices 612 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 600.

User interface output devices 614 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 600.

Storage subsystem 606 may be configured to store the basic programming and data constructs that provide the functionality of the present invention. For example, according to an embodiment of the present invention, software modules implementing the functionality of the present invention may be stored in storage subsystem 606. These software modules may be executed by processor(s) 602. Storage subsystem 606 may also provide a repository for storing data used in accordance with the present invention. Storage subsystem 606 may comprise memory subsystem 608 and file/disk storage subsystem 610.

Memory subsystem 608 may include a number of memories including a main random access memory (RAM) 618 for storage of instructions and data during program execution and a read only memory (ROM) 620 in which fixed instructions are stored. File storage subsystem 610 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 604 provides a mechanism for letting the various components and subsystems of data processing system 602 communicate with each other as intended. Although bus subsystem 604 is shown schematically as a single bus, alternative embodiments of the bus subsystem may utilize multiple busses.

Data processing system 600 can be of varying types including a personal computer, a portable computer, a workstation, a network computer, a mainframe, a kiosk, or any other data processing system. Due to the ever-changing nature of computers and networks, the description of data processing system 600 depicted in FIG. 6 is intended only as a specific example for purposes of illustrating the preferred embodiment of the computer system. Many other configurations having more or fewer components than the system depicted in FIG. 6 are possible.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for dynamically adjusting a characteristic for a communication using a gateway, the method comprising:

allowing a communication between a first end device and a second end device at the gateway, the communication being routed from the first end device through a first network and from the second end device through a second network, the first network being different from the second network;

receiving a first indication at an adjuster of the gateway the first indication identifying a first characteristic to be adjusted for the communication and indicating an increase or decrease in the first characteristic, the first indication originating from one of the first and second end devices and sent to the gateway in response to monitoring of at least one characteristic for the communication at the respective first or second end device;

adjusting the first characteristic at the gateway during the communication in response to and based on the first indication, the adjustment causing the first characteristic to change at the first end device and the second end device during the communication without making a local change to the first characteristic by the first end device or the second end device;

receiving a second indication at the adjuster of the gateway from a third end device identifying a second characteristic to be adjusted for the communication and indicating an increase or decrease in the second characteristic, wherein the first characteristic and the second characteristic are different, wherein the third end device is coupled with the gateway through one of the first network or the second network, wherein the third end device participating in the communication between the first end device and the second end device, and wherein the second indication originates at the third end device and is sent to the gateway in response to monitoring of at least one characteristic for the communication at the third end device; and adjusting the second characteristic at the gateway during the communication in response to and based on the second indication, the adjustment causing the second characteristic to change at the first end device, the second end device, and the third end device during the communication without making a local change to the second characteristic by the first end device, second end device, or third end device.

2. The method of claim 1, wherein the first characteristic comprises a volume characteristic or echo characteristic.

3. The method of claim 1, wherein the first characteristic is adjusted by adjusting gain or impedance for the communication.

4. The method of claim 1, wherein the first network comprises a PSTN network and the second network comprises a VOIP network.

5. The method of claim 1, wherein the third end device is configured to check the volume of the call.

6. The method of claim 1, wherein the gateway detects the volume on the communication and is configured to send the indication to the adjuster.

7. The method of claim 1, wherein the first indication is received from the first end device over a data channel separate from a channel being used for the communication.

8. The method of claim 1, wherein the adjustment is made on a per communication basis.

9. A system for dynamically adjusting a characteristic for a communication, the method comprising:

a first end device configured to communicate using a first network;

a second end device configured to communicate using a second network;

a third end device configured to communicate using one of the first network or the second network; and a gateway configured to allow a communication between the first end device, the second end device, and the third end device, the communication being routed through the first network and the second network, the first network being different from the second network, the gateway comprising:

an adjuster configured to:

receive a first indication identifying a first characteristic of the communication to be adjusted for the call and indicating an increase or decrease in the first characteristic, the first indication originating from one of the first, second, and third end devices and sent to the gateway in response to monitoring of at least one characteristic for the communication at the respective first, second, or third end device the characteristic for the communication comprising either a volume of the communication or an echo cancellation of the communication;

adjust the first characteristic during the communication based on the first indication, the adjustment causing a change in the characteristic for the communication at the first end device, the second end device, and the third end device during the communication without a local change to the characteristic by the first end device, second end device, or third end device;

receive a second indication identifying a second characteristic of the communication to be adjusted for the call and indicating an increase or decrease in the second characteristic, the second indication originating from one of the first, second, and third end devices and sent to the gateway in response to monitoring of at least one characteristic for the communication at the respective first, second, or third end device the second characteristic for the communication comprising either a volume of the communication or an echo cancellation of the communication and wherein the first characteristic and the second characteristic are different; and adjust the second characteristic during the communication based on the second indication, the adjustment causing a change in the characteristic for the communication at the first end device, the second end device, and the third end device during the communication without a local change to the characteristic by the first end device, second end device, or third end device.

10. The system of claim 9, wherein the first characteristic is adjusted by adjusting gain or impedance for the call.

11. The system of claim 9, wherein the first network comprises a PSTN network and the second network comprises a VOIP network.

12. A computer readable memory having stored thereon a sequence of instructions which, when executed by a processor, cause the processor to provide for dynamically adjusting a characteristic for a communication using a gateway by:

allowing a communication between a first end device and a second end device at the gateway, the communication being routed from the first end device through a first network and from the second end device through a second network, the first network being different from the second network;

receiving a first indication at an adjuster of the gateway the first indication identifying a first characteristic to be adjusted for the communication and indicating an increase or decrease in the first characteristic, the first indication originating from one of the first and second end devices and sent to the gateway in response to monitoring of at least one characteristic for the communication at the respective first or second end device;

adjusting the first characteristic at the gateway during the communication in response to and based on the first indication, the adjustment causing the first characteristic to change at the first end device and the second end device during the communication without making a local change to the first characteristic by the first end device or the second end device;

receiving a second indication at the adjuster of the gateway from a third end device identifying a second characteristic to be adjusted for the communication and indicating an increase or decrease in the second characteristic, wherein the first characteristic and the second characteristic are different, wherein the third end device is coupled with the gateway through one of the first network or the second network, wherein the third end device participating in the communication between the first end device and the second end device, and wherein the second indication originates at the third end device and is sent to the gateway in response to monitoring of at least one characteristic for the communication at the third end device; and adjusting the second characteristic at the gateway during the communication in response to and based on the second indication, the adjustment causing the second characteristic to change at the first end device, the second end device, and the third end device during the communication without making a local change to the second characteristic by the first end device, second end device, or third end device.

13. The computer readable memory of claim 12, wherein the first characteristic comprises a volume characteristic or echo characteristic.

14. The computer readable memory of claim 12, wherein the first characteristic is adjusted by adjusting gain or impedance for the communication.

15. The computer readable memory of claim 12, wherein the first network comprises a PSTN network and the second network comprises a VOIP network.

16. The computer readable memory of claim 12, wherein the third end device is configured to check the volume of the call.

17. The computer readable memory of claim 12, wherein the gateway detects the volume on the communication and is configured to send the indication to the adjuster.

18. The computer readable memory of claim 12, wherein the first indication is received from the first end device over a data channel separate from a channel being used for the communication.

19. The computer readable memory of claim 12, wherein the adjustment is made on a per communication basis.

* * * * *

UNITED STATES PATENT AND TRADEMARK OFFICE
CERTIFICATE OF CORRECTION

| | |
|---|---|
| PATENT NO. | : 8,077,700 B2 |
| APPLICATION NO. | : 11/264787 |
| DATED | : December 13, 2011 |
| INVENTOR(S) | : Maes |

It is certified that error appears in the above-identified patent and that said Letters Patent is hereby corrected as shown below:

In column 7, line 17, delete "600.includes" and insert -- 600 includes --, therefor.

Signed and Sealed this
Thirteenth Day of March, 2012

David J. Kappos
*Director of the United States Patent and Trademark Office*